United States Patent
Takayama et al.

(10) Patent No.: US 10,574,979 B2
(45) Date of Patent: Feb. 25, 2020

(54) IMAGE SENSOR HAVING A PROCESSING PART FOR READING AND/OR WRITING INFORMATION FROM/TO THE MEMORY OF EACH OF MODULARIZED COMPONENTS

(71) Applicant: OMRON Corporation, Kyoto (JP)

(72) Inventors: Masahiro Takayama, Kusatsu (JP); Masaru Horie, Kusatsu (JP); Hirofumi Ina, Kusatsu (JP); Kosuke Watanabe, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/188,307

(22) Filed: Nov. 13, 2018

(65) Prior Publication Data

US 2019/0268591 A1 Aug. 29, 2019

(30) Foreign Application Priority Data

Feb. 23, 2018 (JP) .................... 2018-031001

(51) Int. Cl.
| | |
|---|---|
| *H04N 17/00* | (2006.01) |
| *H04N 5/225* | (2006.01) |
| *H04N 5/232* | (2006.01) |
| *H04N 1/00* | (2006.01) |
| *G03B 15/03* | (2006.01) |
| *G03B 17/14* | (2006.01) |

(52) U.S. Cl.
CPC ....... *H04N 17/002* (2013.01); *H04N 1/00538* (2013.01); *H04N 5/2251* (2013.01); *H04N 5/2252* (2013.01); *H04N 5/2253* (2013.01); *H04N 5/2254* (2013.01); *H04N 5/2256* (2013.01); *H04N 5/232* (2013.01); *G03B 15/03* (2013.01); *G03B 17/14* (2013.01); *G03B 2206/002* (2013.01); *G03B 2217/002* (2013.01)

(58) Field of Classification Search
CPC ............. H04N 17/002; H04N 5/23206; H04N 5/2253; H04N 5/2254; H04W 12/06
USPC ......................................... 250/208.1, 214 R
See application file for complete search history.

(56) References Cited

U.S. PATENT DOCUMENTS

| | | | |
|---|---|---|---|
| 10,356,347 B2 * | 7/2019 | Tuempner | G06T 5/002 |
| 2006/0023070 A1 | 2/2006 | Nakamura et al. | |
| 2013/0111464 A1 | 5/2013 | Markas et al. | |

FOREIGN PATENT DOCUMENTS

JP 2007214682 8/2007

OTHER PUBLICATIONS

"Search Report of Europe Counterpart Application", dated Sep. 4, 2019, pp. 1-8.

* cited by examiner

*Primary Examiner* — Que Tan Le

(74) *Attorney, Agent, or Firm* — JCIPRNET

(57) ABSTRACT

Provided is a technique for facilitating management of an image sensor having a modular structure. The image sensor includes an imaging system and a processing part executing a process using an image acquired by the imaging system. The imaging system is configured by combining a plurality of modularized components. Each of the components includes a non-volatile memory. The processing part is capable of reading and/or writing information from/to the memory of each of the components.

20 Claims, 3 Drawing Sheets

IMAGE SENSOR HAVING A PROCESSING PART FOR READING AND/OR WRITING INFORMATION FROM/TO THE MEMORY OF EACH OF MODULARIZED COMPONENTS

CROSS-REFERENCE TO RELATED APPLICATION

This application claims the priority benefit of Japanese application serial no. 2018-031001, filed on Feb. 23, 2018. The entirety of the above-mentioned patent application is hereby incorporated by reference herein and made a part of this specification.

BACKGROUND

Technical Field

The disclosure relates to an image sensor used in a production line of a factory, etc. and particularly relates to a modular image sensor constituted by a combination of multiple modules.

Description of Related Art

In the production line of a factory, a system called image sensor is frequently used for automating the inspection and management of products and saving labor. In the past, the configuration that connects a camera and an image processing device with a cable is common (see Patent Document 1: Japanese Laid-open No. 2007-214682), but recently a processing-integrated image sensor has also been launched which integrates the camera and the image processing device so as to perform from imaging to image processing with a single device. Such a processing-integrated image sensor is also called a "smart camera" and may be forming by integrating illuminations and lenses.

In order to carry out stable inspection with the image sensor, it is desirable to optimize the model (type), specification and performance of the illuminations, lenses, and imaging elements according to the imaging environment, the object to be inspected, the purposes, etc. Therefore, makers who provide smart cameras have lined up a large number of products such as illuminations, lenses, imaging elements, etc., with the model (type), specification and performance changed little by little, for the user to select the one with the optimum specification.

However, as the IoT development of factories is accelerating, the range of application of smart cameras has expanded, and it is becoming difficult to provide product variations that cover the diverse user needs. Further, in order to be distinguished from the competitors in product competition, more mass customization and seasonal products are offered to meet the preference of each customer and the life cycle of the products of digital devices typified by smart phones is shortening, and there is an increasing need for partially changing the illuminations and lenses, etc. so that change of the object to be inspected enters a short cycle to be optimum for the inspection. Thus, in the recent years, the so-called modular structure smart camera has been introduced, which respectively modularizes the illuminations, lenses, and imaging elements for the user to freely combine the illuminations, lenses, and imaging elements. For example, if the maker provides five types of illumination modules, lens modules, and imaging element modules, there are 125 possible combinations, from which the user can select a combination that matches the required specification.

The modular structure has the merits of reducing product variations for the makers and increasing choices and flexibility for the user. On the other hand, the following demerits raise concerns. In the past, managing the equipment in units of the image sensor is sufficient to deal with the trouble and maintenance in the factory. However, when the image sensor having a modular structure is introduced, each image sensor may be composed of any combination of modules and it is foreseeable that there will be a higher demand for grasping details of the respective modules (date of production, time of introduction, time of use, history of diversion from other equipment, detailed specification, etc.), and management, maintenance and preservation of the equipment may be complicated. Usually a large number of image sensors are installed in the factory (for example, when it comes to a large-scale factory, the number may be up to several hundreds to several thousands). Therefore, it increases the trouble in management, maintenance and preservation, which is a serious problem.

SUMMARY

The disclosure has been made in view of the above and aims to provide a technique for facilitating management of an image sensor having a modular structure.

The first aspect of the disclosure provides an image sensor, including: an imaging system; and a processing part executing a process using an image acquired by the imaging system, wherein the imaging system is configured by combining a plurality of modularized components, each of the components includes a non-volatile memory, and the processing part is capable of reading and/or writing information from/to the memory of each of the components.

The second aspect of the disclosure provides an image sensor, including: an illumination part illuminating a subject; a lens part forming an optical image of the subject; an imaging part generating an image based on the optical image; and a processing part executing a process using the image, wherein the processing part is provided in a sensor body. Any combination of the illumination part, the lens part, and the imaging part selected from a plurality of illumination parts of different types, a plurality of lens parts of different types, and a plurality of imaging parts of different types is attachable to the sensor body. The illumination part includes a non-volatile memory storing information related to the illumination part, the lens part includes a non-volatile memory storing information related to the lens part, and the imaging part includes a non-volatile memory storing information related to the imaging part. The processing part specifies a combination of the illumination part, the lens part, and the imaging part attached to the sensor body based on the information respectively read from the memory of the illumination part, the memory of the lens part, and the memory of the imaging part.

DESCRIPTION OF THE EMBODIMENTS

Figure 1A:
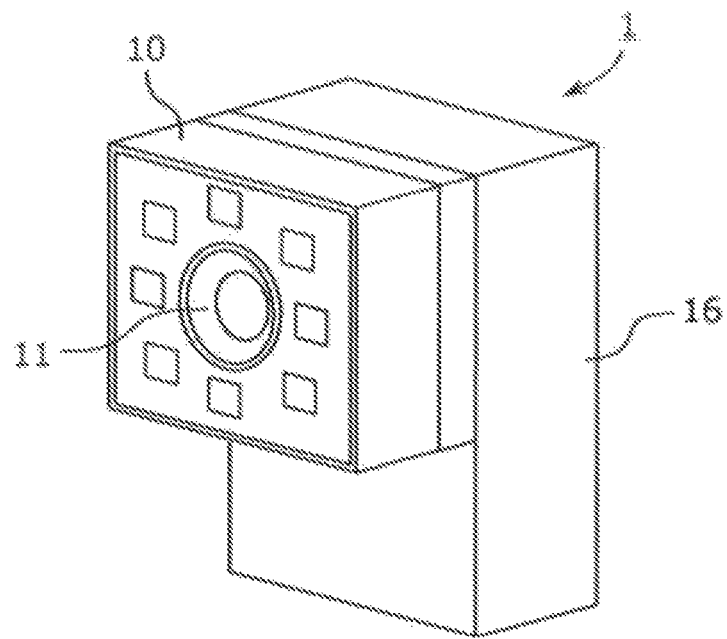
FIG. 1(A) is a perspective view schematically showing the appearance of an image sensor and FIG. 1(B) is a perspective view schematically showing a state where the image sensor is disassembled.

The first aspect of the disclosure provides an image sensor, including: an imaging system; and a processing part executing a process using an image acquired by the imaging system, wherein the imaging system is configured by combining a plurality of modularized components, each of the components includes a non-volatile memory, and the processing part is capable of reading and/or writing information from/to the memory of each of the components.

According to this configuration, since each of the components has a non-volatile memory, the specific information, etc. related to each component can be stored in the memory of the component itself. Thus, it is possible to link the component (hardware) with its specific information (software) for handling, and the processing part can easily check the combination of the components constituting the imaging system by software by referring to the information in the memory of the component. Therefore, it is possible to facilitate management of the image sensor having the modular structure.

The memory may store at least information (type information) for specifying a type of the component. By referring to such type information, it is possible to easily specify the type of each component constituting the imaging system. For example, a type name or a type number on the catalog, or information obtained by encoding them, etc. can be used as the type information.

The memory may store at least information (individual information) for specifying an individual of the component. By referring to such individual information, it is possible to easily specify the individual of each component constituting the imaging system. For example, a serial number or a lot number of the product, or information obtained by encoding them, etc. can be used as the individual information.

The memory may store at least information indicating a performance and/or a function of the component. By referring to such information, it is possible to easily specify the performance and function of each component constituting the imaging system.

The memory may have a first storage area that is not rewritable by a user of the image sensor and a second storage area that is rewritable by the user. By providing the storage areas with different access authorities as described above, the usefulness of the memory can be improved. For example, invariant information such as the type information, individual information, performance and function (information that should not be rewritten) may be written to the first storage area by the supplier such as the maker at the time of shipment of the components for the user to refer to (read) only. On the other hand, by preparing a storage area like the second storage area to be freely used by the user, for example, information of the user's own management items such as the purchase date, inspection date, and installation location can be kept and managed together with the component (hardware).

The components include an illumination part for illuminating a subject, a lens part for forming an optical image of the subject, and an imaging part for generating the image based on the optical image. By changing the combination of the illumination part, the lens part, and the imaging part, imaging systems of various specifications can be constructed.

The second aspect of the disclosure provides an image sensor, including: an illumination part illuminating a subject; a lens part forming an optical image of the subject; an imaging part generating an image based on the optical image; and a processing part executing a process using the image, wherein the processing part is provided in a sensor body. Any combination of the illumination part, the lens part, and the imaging part selected from a plurality of illumination parts of different types, a plurality of lens parts of different types, and a plurality of imaging parts of different types is attachable to the sensor body. The illumination part includes a non-volatile memory storing information related to the illumination part, the lens part includes a non-volatile memory storing information related to the lens part, and the imaging part includes a non-volatile memory storing information related to the imaging part. The processing part specifies a combination of the illumination part, the lens part, and the imaging part attached to the sensor body based on the information respectively read from the memory of the illumination part, the memory of the lens part, and the memory of the imaging part.

According to this configuration, the image sensor (processing part) itself can easily check the combination of the illumination part, the lens part, and the imaging part constituting the image sensor. Therefore, it is possible to facilitate management of the image sensor having the modular structure.

The processing part may output information representing the combination of the illumination part, the lens part, and the imaging part attached to the sensor body to an external device. By providing the image sensor with such an output function, the external device (for example, computer for management, PLC, etc.) can easily collect the module configuration of the image sensor. Therefore, for example, it is easy to collectively manage a large number of image sensors installed in the factory with a management computer, and for the PLC to change the control content according to the module configurations of the image sensors.

According to the disclosure, it is possible to provide a technique for facilitating management of an image sensor having a modular structure.

Application Example

Figure 1B:
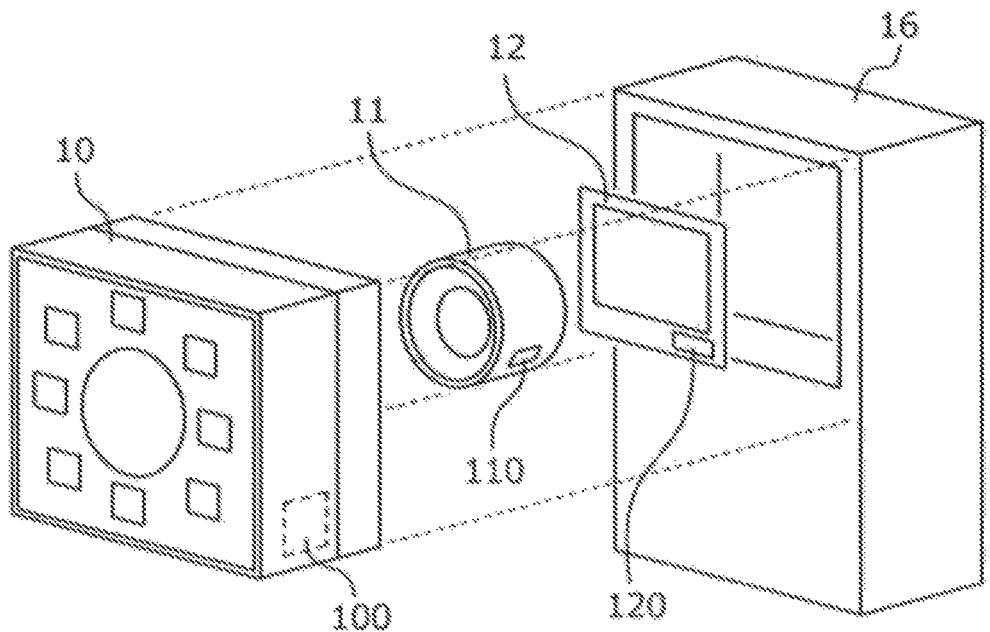

First, an example of the scene to which the disclosure is applied will be described. FIG. 1(A) and FIG. 1(B) schematically show an example of an image sensor according to an embodiment of the disclosure.

The image sensor 1 of the present embodiment is a processing-integrated image sensor having a so-called modular structure. An illumination part 10, a lens part 11, and an imaging part 12, which are components of the imaging system, are modularized respectively and the user can combine the respective modules as desired according to the purposes, etc. of the image sensor 1. Non-volatile memories 100, 110, and 120 are respectively provided in the modules (the illumination part 10, the lens part 11, and the imaging part 12). The factory default type information, individual information, etc. are stored in the memories 100, 110, and 120. In addition, the user can write any information (user data) to the memories 100, 110, and 120. A processing part 14 (see FIG. 2) of a sensor body 16 can perform information reading and/or writing on the memories 100, 110, and 120 of the modules.

As described above, by providing a non-volatile memory in each module and storing the specific information related to the module therein for reference, the combination of the modules that constitute the image sensor 1 can be easily checked by the image sensor 1 (the processing part 14) itself or an external computer, etc., for example. Therefore, it is possible to facilitate management of the image sensor having the modular structure.

<Configuration of the Image Sensor>

Figure 2:
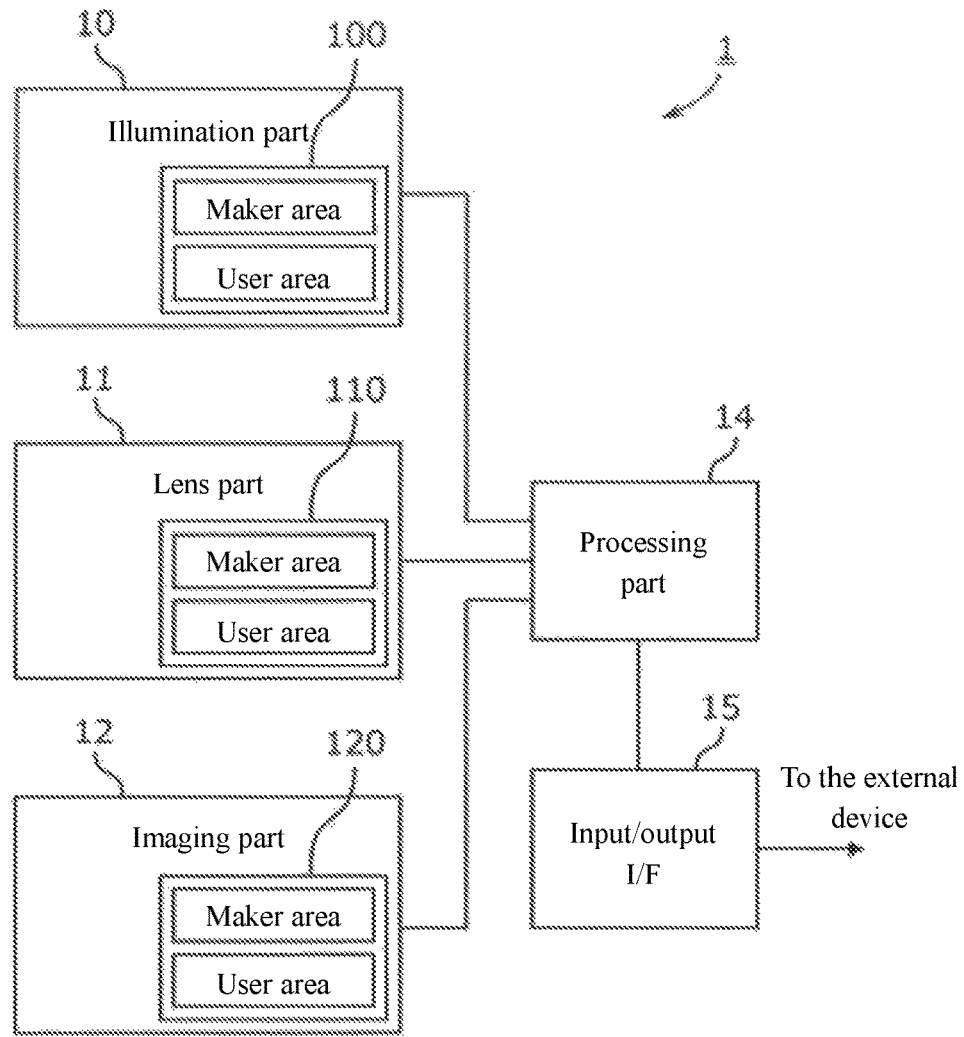
FIG. 2 is a block diagram schematically showing the configuration of the image sensor.
Figure 3:
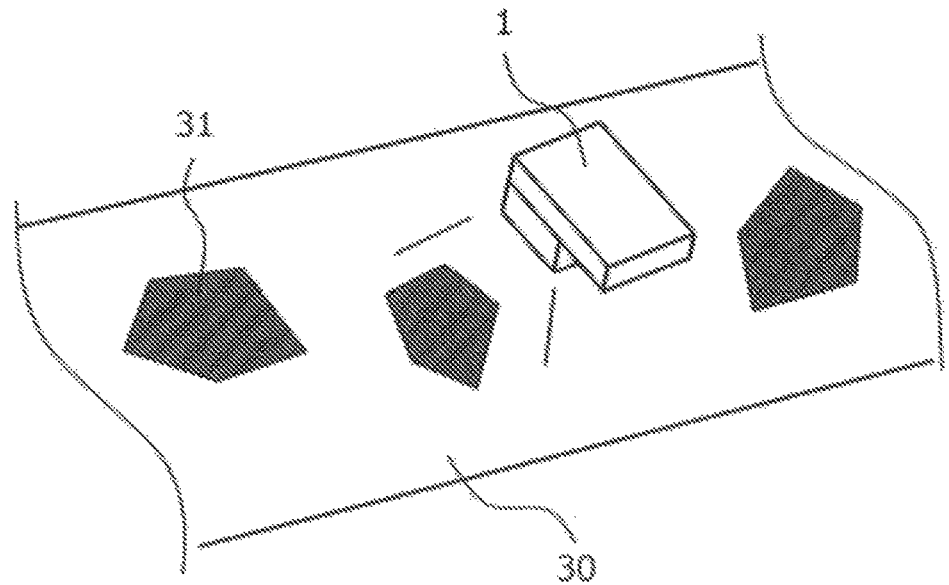
FIG. 3 is a view showing an example of use of the image sensor.

The image sensor according to an embodiment of the disclosure will be described with reference to FIG. 1(A) to FIG. 3. FIG. 1(A) is a perspective view schematically showing the appearance of the image sensor and FIG. 1(B) is a perspective view schematically showing a state where the image sensor is disassembled. FIG. 2 is a block diagram schematically showing the configuration of the image sensor. FIG. 3 is a view showing an example of use of the image sensor.

The image sensor 1 is a device installed in a production line of a factory, for example, and used for various processes using images. The image sensor 1 is also called a vision sensor or a vision system. The image sensor 1 of the present embodiment is a processing-integrated image sensor (the so-called smart camera) formed by integrating an imaging system and a processing system.

The image sensor 1 includes the illumination part 10, the lens part 11, and the imaging part 12 as the imaging system. The illumination part 10 is a device for illuminating a subject (an object to be inspected, etc.) within a field of view of the image sensor 1 and is composed of a plurality of light emitting elements (LEDs, etc.) arranged around the lens part 11, for example. The lens part 11 is an optical system for forming an optical image of the subject on the imaging part 12. For example, an optical system having functions such as focus adjustment, aperture, zoom, etc. is used. The imaging part 12 is a device for generating and outputting image data through photoelectric conversion and is composed of imaging elements such as CCD and CMOS, for example.

The image sensor 1 further includes the processing part 14 and an input/output I/F 15 as the processing system. The processing part 14 is a device for performing image processing (for example, preprocessing, feature amount extraction, etc.) on the image data taken from the imaging system, various processes based on the result of the image processing (for example, inspection, character recognition, individual identification, etc.), data transmission/reception with an external device via the input/output I/F 15, generation of data to be outputted to the external device, processing of data received from the external device, control of the imaging system and the input/output I/F 15, etc. The processing part 14 is composed of a processor and a memory, for example, and the processor reads and executes programs stored in the memory so as to realize the various processes described above. A part or all of the functions of the processing part 14 may be realized by an ASIC, an FPGA, etc. or may be provided by the external device. The input/output I/F 15 is a communication interface for transmitting/receiving data to/from the external device. For example, the input/output I/F 15 includes a network interface for connecting to a PLC or a management terminal (computer), a parallel interface for connecting to another sensor or controller, etc.

The image sensor 1 of the present embodiment has a modular structure in which, as shown in FIG. 1(B), the three modules, i.e., the illumination part 10, the lens part 11, and the imaging part 12, are selected and attached to the sensor body 16. Regarding the illumination part, it is also possible to use it without selecting it. Each of the modules is fixed to the sensor body 16 by screw fastening, for example, and the user can attach/detach the module freely.

Multiple types of modules are prepared to serve as the illumination part (illumination module) 10, such as modules with illumination lights of different wavelengths like white illumination/red illumination/infrared light illumination, and modules with different light emitting element arrangements, light quantities, or light emitting patterns. Further, multiple types of light sources (LEDs, etc.) such as red, blue, green, and infrared light sources are provided in one module, and an illumination module that is capable of irradiating lights of wavelengths (for example, white, violet, pink, etc.) other than red, blue, green, and infrared through control of light emission of each light source may also be used. This type of illumination is called multi-color illumination, etc. Multiple types of modules are prepared to serve as the lens part (lens module) 11, such as a module having a function of adjusting the focus manually or automatically with use of an actuator, etc., a module with different fields of view such as a narrow field of view/a wide field of view, and a module having a zoom function. Multiple types of modules are prepared to serve as the imaging part 12, such as modules having different numbers of pixels, frame rates, and shutter types (rolling shutter/global shutter). The user can combine proper modules as appropriate according to the purpose or the required specification of the image sensor 1.

A non-volatile memory is incorporated in each module. Specifically, as shown in FIG. 2, an illumination module memory 100 is incorporated in the illumination part 10, a lens module memory 110 is incorporated in the lens part 11, and an imaging module memory 120 is incorporated in the imaging part 12. Hereinafter, these are collectively referred to as "module memory". For example, EPROM, EEPROM, FeRAM, MRAM, etc. can be used as the module memory, and the module memory may have any data capacity. In the present embodiment, an EEPROM having a capacity of several kilobytes to several tens of megabytes is used.

In the module memory, two writing areas, i.e., "maker area" and "user area", are provided. The maker area is an area for the maker to write module default data. The user can read the data in the maker area but cannot rewrite or delete the data in the maker area. For example, type information (type name, type number, etc.) and individual information (serial number, lot number, hardware version, etc.) of the module are stored in the maker area. In addition, setting values and correction parameters during driving of the module, and individual variation information of the module (for example, data measured by factory shipment inspection) may be stored in the module memory. For example, in the case of the illumination part, the illumination control setting values (control type, voltage, Duty, delay, block lighting method, etc.), variation in brightness and color tone of each light source, optical axis information, etc. may be stored. In the case of the lens part, lens/focus setting values (focus initial reference value, etc.), presence/absence of AF function, focal length, angle of view, F value, distortion amount, optical axis information, etc. may be stored. Further, in the case of the imaging part, camera setting values (setting initial value of the imaging element, etc.), pixel defect correction, vertical stripe correction data, white balance initial value, etc. may be stored. In contrast, the user area is an area that the user can rewrite. The user can freely use the user area. For example, any information may be stored therein, such as the information that specifies the location (factory, production line) where the image sensor is installed, information on the purchase date and maintenance date of the module, status of use of the module, etc. Nevertheless, the above is merely an example, and any data that is useful information for management and operation of the image sensor 1 may be stored in module memory.

The image sensor 1 can be used for various purposes. For example, the image sensor 1 can be used for recording the image of the object under inspection, recognizing the shape, detecting the edge, measuring the width and the number, measuring the area, acquiring color features, labeling and segmentation, object recognition, reading bar codes and two-dimensional codes, OCR, individual identification, etc. FIG. 3 shows an example of imaging a product 31 flowing on a conveyor 30 with the image sensor 1 and inspecting the appearance of the product 31.

<Example of Use of the Module Memory>

In the image sensor 1 of the present embodiment, since each of the modules (components) has a non-volatile memory, the specific information, etc. related to each module can be stored in the memory of the module itself. Thus, it is possible to link the module (hardware) with its specific information (software) for handling, and the processing part 14 can easily and correctly check the combination of the modules attached to the image sensor 1 by software by referring to the information in the memory of each module. Therefore, it is possible to facilitate management and operation of the image sensor 1 having a modular structure. Some examples of use of the module memory will be described hereinafter.

(1) Collection of the Module Configuration

Figure 4:
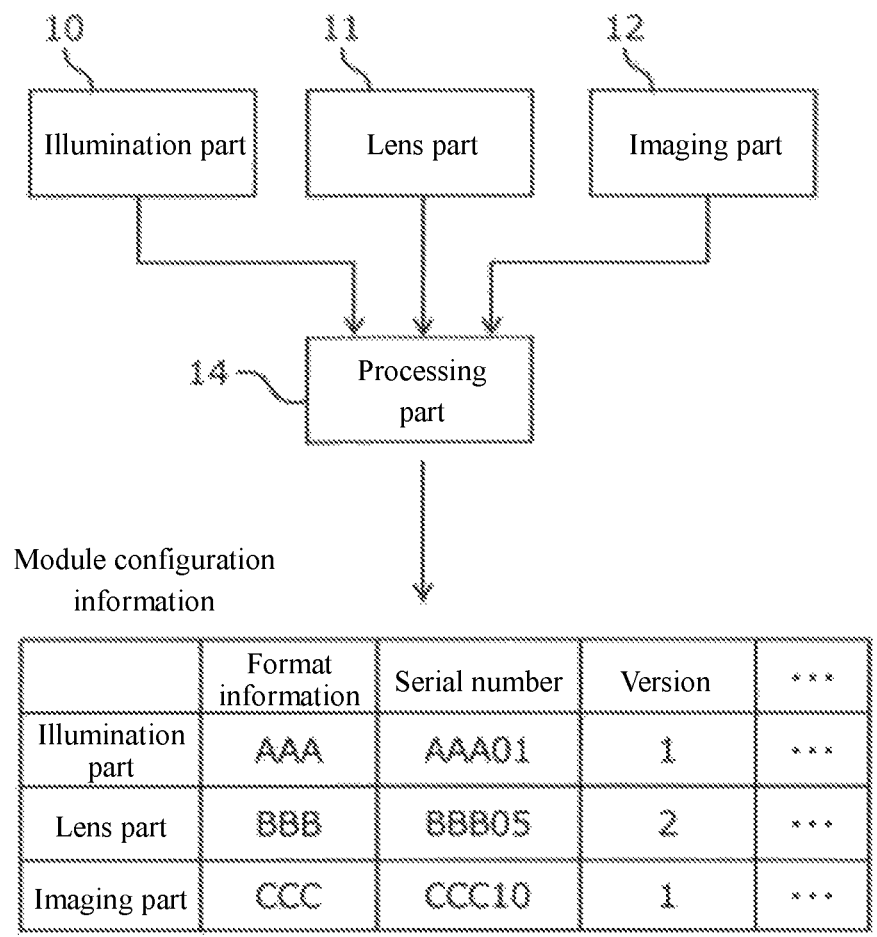
FIG. 4 is a diagram showing an example of collection of module configuration information.

As shown in FIG. 4, upon start-up of the image sensor 1 or in response to a request from the external device, the processing part 14 reads information respectively from the memory 100 of the illumination part 10, the memory 110 of the lens part 11, and the memory 120 of the imaging part 12, and based on the information, generates module configuration information representing the combination of the modules attached to the sensor body 16 and records it in the memory in the processing part 14. The processing part 14 sends the module configuration information to the external device spontaneously (periodically) or in response to a request from the external device. Alternatively, if the image sensor 1 has a display, the processing part 14 may display the module configuration information on the display. By using the function of collecting the module configuration described above, the user (including the administrator of the equipment) can easily collect and grasp the module configuration of the image sensor 1 in operation. In addition, it is easy to automatically collect the module configuration information of many image sensors installed in the production line and manage them unitarily in the external device (computer for management, etc.). The type of the module configuration information does not matter. For example, the processing part 14 may directly output the information read from the memory of each module as the module configuration information, or may output information generated using the information read from the memory as the module configuration information (for example, the processing part 14 may generate information of one integrated type by combining read information of multiple types, or generate information indicating a period by taking the difference between the current date and the use start date). Moreover, the module configuration information may include information other than the information that represents the combination of the modules.

(2) Cause Identification at the Time when Trouble Occurs

By collecting the module configuration information of all the image sensors installed in the production line in the external device (computer for management, etc.), for example, it is possible to unitarily manage the module configuration of the image sensor being used, the installation location (installed process), the type and version of each module, the introduction time, etc. Therefore, for example, when any trouble occurs in the production line, it is possible to promptly identify the problematic image sensor, investigate the cause (module deterioration, old version, etc.), and prepare countermeasures (module repair and exchange, version upgrade, etc.) based on the module configuration information.

(3) Maintenance

Information on the use start date or use status of the module may be recorded in the module memory and the processing part 14 or the external device may predict deterioration or lifetime of the module based on such information. Thus, it is easy to manage the times of inspection and replacement of the module, which can be used for maintenance planning. Further, information on the calibration date may be recorded in the module memory and the processing part 14 or the external device may check whether calibration (maintenance) is required for each module and automatically notify the user of the calibration time, etc.

(4) Automatic Creation of the Module Configuration Table

The external device may automatically create a list of the module configurations of the image sensors installed in the production line based on the collected module configuration information. For example, such a list can be used for grasping the operating equipment of the production line, and can also be used as order information for purchasing required image sensors and modules when a new copy line having the same configuration as the current production line is launched.

<Others>

Nevertheless, the above embodiment merely exemplifies a configuration example of the disclosure. The disclosure is not limited to the specific forms described above, and it is possible to make various modifications within the scope of the technical idea of the disclosure. For example, although the above embodiment illustrates an example that the three modules are the illumination part, the lens part, and the imaging part, the components to be attached to the image sensor are not limited thereto. For example, an optical filter, the input/output I/F, the processing part (processor or memory), the display, etc. may also be modularized. Regarding the forms in which the smart camera is provided (delivery forms), the modules may be provided separately to be assembled on the user side, or the smart camera may be provided with the illumination module and the lens module incorporated in the sensor body. In the case of the latter form, there is no need to adjust the optical conditions on the user side, so it has the advantage that the image sensor can be introduced more easily.

APPENDIX (1) An image sensor (1), comprising:
an imaging system (10, 11, 12); and
a processing part (14) executing a process using an image acquired by the imaging system (10, 11, 12),
wherein the imaging system is configured by combining a plurality of modularized components (10, 11, 12),
each of the components (10, 11, 12) comprises a non-volatile memory (100, 110, 120), and
the processing part (14) is capable of reading and/or writing information from/to the memory (100, 110, 120) of each of the components.

(2) An image sensor (1), comprising:
an illumination part (10) illuminating a subject;
a lens part (11) forming an optical image of the subject;
an imaging part (12) generating an image based on the optical image; and
a processing part (14) executing a process using the image,
wherein the processing part (14) is provided in a sensor body (16),
any combination of the illumination part (10), the lens part (11), and the imaging part (12) selected from a plurality of illumination parts of different types, a plurality of lens parts of different types, and a plurality of imaging parts of different types is attachable to the sensor body (16),
the illumination part (10) comprises a non-volatile memory (100) storing information related to the illumination part (10),
the lens part (11) comprises a non-volatile memory (110) storing information related to the lens part (11),
the imaging part (12) comprises a non-volatile memory (120) storing information related to the imaging part (12), and
the processing part (14) specifies a combination of the illumination part (10), the lens part (11), and the imaging part (12) attached to the sensor body (16) based on the information respectively read from the memory (100) of the illumination part, the memory (110) of the lens part, and the memory (120) of the imaging part.

What is claimed is:

1. An image sensor, comprising:
an imaging system; and
a processing part executing a process using an image acquired by the imaging system,
wherein the imaging system is configured by combining a plurality of modularized components,
each of the components comprises a non-volatile memory, and
the processing part is capable of reading and/or writing information from/to the memory of each of the components.

2. The image sensor according to claim 1, wherein the memory stores at least information for specifying a type of the component.

3. The image sensor according to claim 1, wherein the memory stores at least information for specifying an individual of the component.

4. The image sensor according to claim 1, wherein the memory stores at least information indicating a performance and/or a function of the component.

5. The image sensor according to claim 1, wherein the memory has a first storage area that is not rewritable by a user of the image sensor and a second storage area that is rewritable by the user.

6. The image sensor according to claim 1, wherein the components comprise an illumination part for illuminating a subject, a lens part for forming an optical image of the subject, and an imaging part for generating the image based on the optical image.

7. An image sensor, comprising:
an illumination part illuminating a subject;
a lens part forming an optical image of the subject;
an imaging part generating an image based on the optical image; and
a processing part executing a process using the image,
wherein the processing part is provided in a sensor body,
any combination of the illumination part, the lens part, and the imaging part selected from a plurality of illumination parts of different types, a plurality of lens parts of different types, and a plurality of imaging parts of different types is attachable to the sensor body,
the illumination part comprises a non-volatile memory storing information related to the illumination part,
the lens part comprises a non-volatile memory storing information related to the lens part,
the imaging part comprises a non-volatile memory storing information related to the imaging part, and
the processing part specifies a combination of the illumination part, the lens part, and the imaging part attached to the sensor body based on the information respectively read from the memory of the illumination part, the memory of the lens part, and the memory of the imaging part.

8. The image sensor according to claim 7, wherein the processing part outputs information representing the combination of the illumination part, the lens part, and the imaging part attached to the sensor body to an external device.

9. The image sensor according to claim 2, wherein the memory stores at least information for specifying an individual of the component.

10. The image sensor according to claim 2, wherein the memory stores at least information indicating a performance and/or a function of the component.

11. The image sensor according to claim 3, wherein the memory stores at least information indicating a performance and/or a function of the component.

12. The image sensor according to claim 2, wherein the memory has a first storage area that is not rewritable by a user of the image sensor and a second storage area that is rewritable by the user.

13. The image sensor according to claim 3, wherein the memory has a first storage area that is not rewritable by a user of the image sensor and a second storage area that is rewritable by the user.

14. The image sensor according to claim 4, wherein the memory has a first storage area that is not rewritable by a user of the image sensor and a second storage area that is rewritable by the user.

15. The image sensor according to claim 2, wherein the components comprise an illumination part for illuminating a subject, a lens part for forming an optical image of the subject, and an imaging part for generating the image based on the optical image.

16. The image sensor according to claim 3, wherein the components comprise an illumination part for illuminating a subject, a lens part for forming an optical image of the subject, and an imaging part for generating the image based on the optical image.

17. The image sensor according to claim 4, wherein the components comprise an illumination part for illuminating a subject, a lens part for forming an optical image of the subject, and an imaging part for generating the image based on the optical image.

18. The image sensor according to claim 5, wherein the components comprise an illumination part for illuminating a subject, a lens part for forming an optical image of the subject, and an imaging part for generating the image based on the optical image.

19. The image sensor according to claim 9, wherein the memory stores at least information indicating a performance and/or a function of the component.

20. The image sensor according to claim 10, wherein the memory has a first storage area that is not rewritable by a user of the image sensor and a second storage area that is rewritable by the user.

\* \* \* \* \*